United States Patent [19]
Rigaux et al.

[11] Patent Number: 5,624,192
[45] Date of Patent: Apr. 29, 1997

[54] ROLLING-CONTACT BEARING EQUIPPED WITH A BUILT-IN DEVICE FOR DETECTING THE SPEED OF ROTATION

[75] Inventors: Christian Rigaux, Artannes-sur-Indre; Claude Caillault, Sain-Roch; Christophe Houdayer, Tours, all of France

[73] Assignee: SKF France, Clamart, France

[21] Appl. No.: 642,863

[22] Filed: May 6, 1996

[30] Foreign Application Priority Data

May 30, 1995 [FR] France .................................. 95 06376

[51] Int. Cl.$^6$ ...................................................... F16C 19/08
[52] U.S. Cl. ............................ 384/448; 384/446; 324/174
[58] Field of Search ....................................... 384/448, 446, 384/544, 589, 510; 324/173, 174

[56] References Cited

U.S. PATENT DOCUMENTS

| | | |
|---|---|---|
| 4,969,753 | 11/1990 | Kato et al. . |
| 5,121,998 | 6/1992 | Bhatia . |
| 5,129,742 | 7/1992 | Tilch et al. . |
| 5,183,341 | 2/1993 | Ouchi et al. . |

FOREIGN PATENT DOCUMENTS

| | | |
|---|---|---|
| A-0-397309 | 11/1990 | European Pat. Off. . |
| A-3817175 | 11/1989 | Germany . |

*Primary Examiner*—Lenard A. Footland
*Attorney, Agent, or Firm*—Beveridge, DeGrandi Weilacher & Young, L.L.P.

[57] ABSTRACT

The rolling-contact bearing comprises one outer race 11, two inner races 12, 13, two rows of rolling bodies 14 held in cages 15 and a built-in device for detecting the speed of rotation, of the type comprising a sensor means 17 and an encoder means 19 which are located in the annular chamber defined between the inner races 12, 13 and outer race 11 and the rolling bodies 14. The encoder means 19 comprises an active part 20 capable of creating in the sensor means 17 a periodic signal of frequency proportional to the rotational speed of the bearing 1. The encoder means 19 comprises a support part 21 secured to the inner races 12, 13 and made of a nonmagnetic material, so that the said support part 21 axially holds the inner races 12, 13 against each other before the bearing 1 is mounted in the mechanical assembly for which it is intended.

According to the invention, the encoder axially secures the inner races after the bearing has been assembled and cannot come into contact with the rolling bodies.

17 Claims, 4 Drawing Sheets

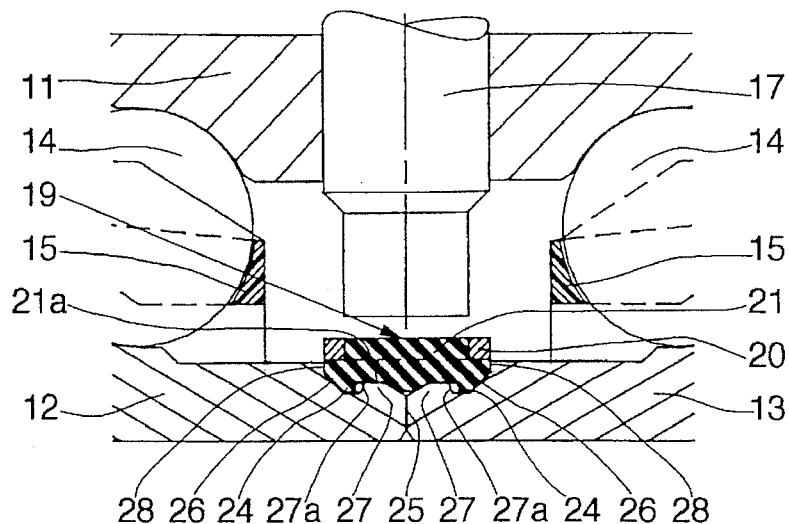
FIG.2
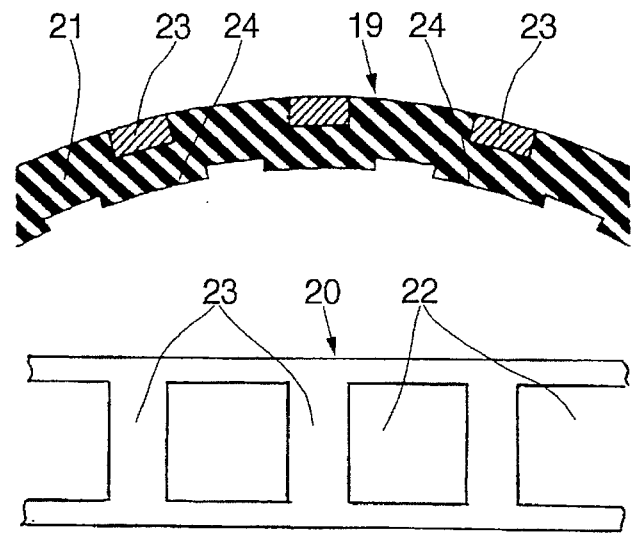
FIG.3
FIG.4
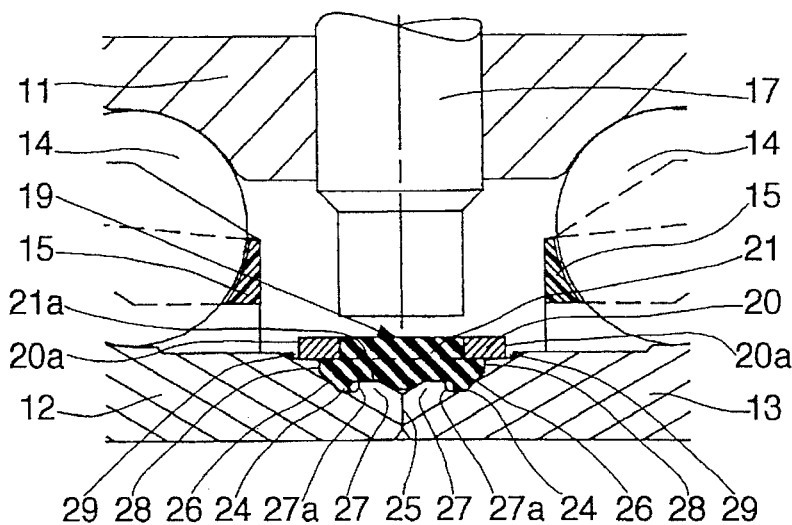
FIG.5

ROLLING-CONTACT BEARING EQUIPPED WITH A BUILT-IN DEVICE FOR DETECTING THE SPEED OF ROTATION

The invention relates to rolling-contact bearings with two rows of rolling bodies between one outer race and two inner races, these being equipped with built-in devices for detecting the speed of rotation, for example motor vehicle wheel bearings coupled to an anti-lock system for the wheels.

The invention relates in particular to rolling-contact bearings equipped with a sensor secured to the outer race and with an encoder which are arranged between the two rows of rolling bodies, the encoder furthermore providing axial retention for the inner races of the bearing between the time when the bearing is assembled and the time when the bearing is mounted in the mechanical assembly for which it is intended, for example a vehicle wheel hub.

U.S. Pat. No. 5,121,998 makes known a rolling-contact bearing comprising a stationary outer race, two rotating inner races, two rows of rollers held in cages, a sensor housed in a radial hole in the stationary race and projecting into the space between the rollers and the inner and outer races, and an encoder mounted on the two inner races. The encoder is composed of an annular component with windows separated by short strips and of two rows of claws for axially holding the inner races while the bearing is being handled before it is definitively mounted. This type of encoder generally operates with an inductive sensor composed of a coil wound on a magnetized core.

A drawback of this type of rolling-contact bearing is that the window type encoder, made of magnetic material, for example of steel sheet, is in contact with cylindrical bearing surfaces of the inner races themselves made of a magnetic material. Now, the quality of the signal obtained in the sensor will be good only if there are sufficient discontinuities of magnetic material between a strip filing past the sensor and a window filing past the sensor.

In such devices, this situation can thus be obtained only by use of an encoder made from relatively thick sheet, which has drawbacks associated with the weight and with the cost of manufacture.

Devices using a single-piece encoder made from a single material may display other drawbacks.

Thus, if there is a desire to use a ring equipped with radial teeth made of a sintered metal as an encoder, it is not possible to envisage holding means such as claws coming directly from the encoder owing to the inelasticity of this material.

The same difficulties are encountered when there is a desire to use a multi-pole ferrite or plastoferrite ring with a high ferrite content as an encoder.

Furthermore, such a device cannot be used in a ball bearing because during the operation of assembling the inner races and the encoder, particularly when introducing the second inner race into the assembly consisting of the first inner race and the encoder, the faces of the rolling bodies of the first inner race and the encoder may come into contact. Such a feature displays a major drawback for a ball bearing insofar as the scoring or marking of a ball caused by the claws of the encoder during the assembly operation may have a substantial impact on the subsequent correct operation of the bearing.

The subject of the invention is therefore a rolling-contact bearing equipped with a built-in device for detecting the speed of rotation which overcomes the aforementioned drawbacks and more particularly a ball bearing equipped with such a device.

Also, an object of the invention is to produce a rolling-contact bearing in which the encoder is insulated from the inner races by a non-magnetic support.

Another object of the invention is to produce a rolling-contact bearing in which the support for the encoder is capable of axially holding the two inner races.

Another object of the invention is to produce a rolling-contact bearing in which the inner races comprise an axial stop capable of preventing the encoder from coming into contact with the rolling bodies while the bearing is being assembled.

According to the invention, the rolling-contact bearing comprises at least one outer race, two inner races, two rows of rolling bodies held in cages and a built-in device for detecting the speed of rotation, of the type comprising a sensor means and an encoder means which are located in the annular chamber defined between the inner races and outer race and the rolling bodies. The encoder means comprises an active part capable of creating in the sensor means a periodic signal of frequency proportional to the rotational speed of the bearing. The encoder means comprises a support part secured to the inner races and made of a non-magnetic material, so that the support part axially holds the inner races against each other before the bearing is mounted in the mechanical assembly for which it is intended.

By virtue of the invention, it is therefore possible to produce the active part of the encoder in several forms and from several sorts of materials while always maintaining a good signal at the sensor means.

What is more, it is possible without difficulty to secure the inner races of the rolling-contact bearing axially by means of the support part of the encoder.

The invention is especially applicable to the case of ball bearings.

In one embodiment of the invention, the inner races comprise holding regions which interact with the support part of the encoder means.

In one embodiment of the invention, the support part of the encoder means comprises means for axial holding which are capable of interacting with an annular slot made on each inner race of the bearing. Advantageously, the holding means are arranged at the axial ends of the support part of the encoder means.

In one embodiment of the invention, the holding means each comprise a row of teeth or an annular rib.

In one embodiment of the invention, each inner race comprises an annular rib arranged at the bottom of the slot close to the front surface of the inner race and provided with a substantially radial portion on its face opposite the front surface of the inner race, capable of interacting with the holding means of the support part of the encoder means.

In one embodiment of the invention, each annular slot of an inner race comprises a bearing surface arranged between the bottom of the slot and the edge of the slot close to the rolling bodies so as to form an axial stop for the encoder means when the second inner race is put in place in contact with the first inner race and encoder means.

In an alternative form, the inner races comprise an additional shoulder on the edge of the slot close to the rolling bodies, this shoulder being intended to interact with a radial portion of the active part of the encoder means.

In one embodiment of the invention, the means for axially holding the support part of the encoder means comprise elastic tabs directed axially, alternating and equipped at each of their free ends with a projection intended to interact with the annular slots in the inner races.

Advantageously, the active part of the encoder means may be covered with the synthetic material of the support part.

In one embodiment of the invention, the active part of the encoder means has a U section, the lateral legs of the U axially surrounding the support part of the encoder means and the central portion of the U being arranged facing the sensor means.

In an alternative form, the encoder means comprises an additional annular element with an L section arranged inside the active part of U section and made of a non-magnetic material, comprising a radial leg and an axial leg arranged between the central portion of the active part of the encoder means and the inner races and separated from the central portion of the active part by an overmoulded elastomer layer. Such an additional annular element is intended to improve the quality of the signal in the sensor means and the rigidity of the encoder means.

In one embodiment of the invention, the support part of the encoder means comprises a bore which axially holds the inner races by clamping them and interacts with the holding regions of the inner races.

Advantageously, each inner race comprises a shoulder adjacent to the holding region and intended for axially securing the support part of the encoder means. Thus, when mounted, the encoder means comes into abutment against the shoulder and cannot come into contact with the rolling bodies.

In another embodiment of the invention, the support part of the encoder means comprises a bore equipped with a plurality of inclined ribs intended to prevent the two inner races from separating after the bearing has been assembled, by a bracing effect.

In one embodiment of the invention, the support part of the encoder means comprises two lips, each one in contact with an inner race, on its axial ends, so as to define an annular chamber between the encoder means and the said inner races.

Thus, by virtue of the invention, a rolling-contact bearing is obtained in which the encoder is capable of axially holding the inner races without being able to come into contact with the rolling bodies during mounting.

The invention will be better understood from studying a few embodiments which are described by way of non-limiting example and are illustrated by the attached drawings, in which:

FIG. 2 is a detail of the rolling-contact bearing of FIG. 1;

FIG. 3 is a part section of the encoder on I—I;

FIG. 4 is a part plan view of the active part of the encoder of FIG. 3;

FIG. 5 is a detail of a rolling-contact bearing according to a second embodiment of the invention;

Figure 1:
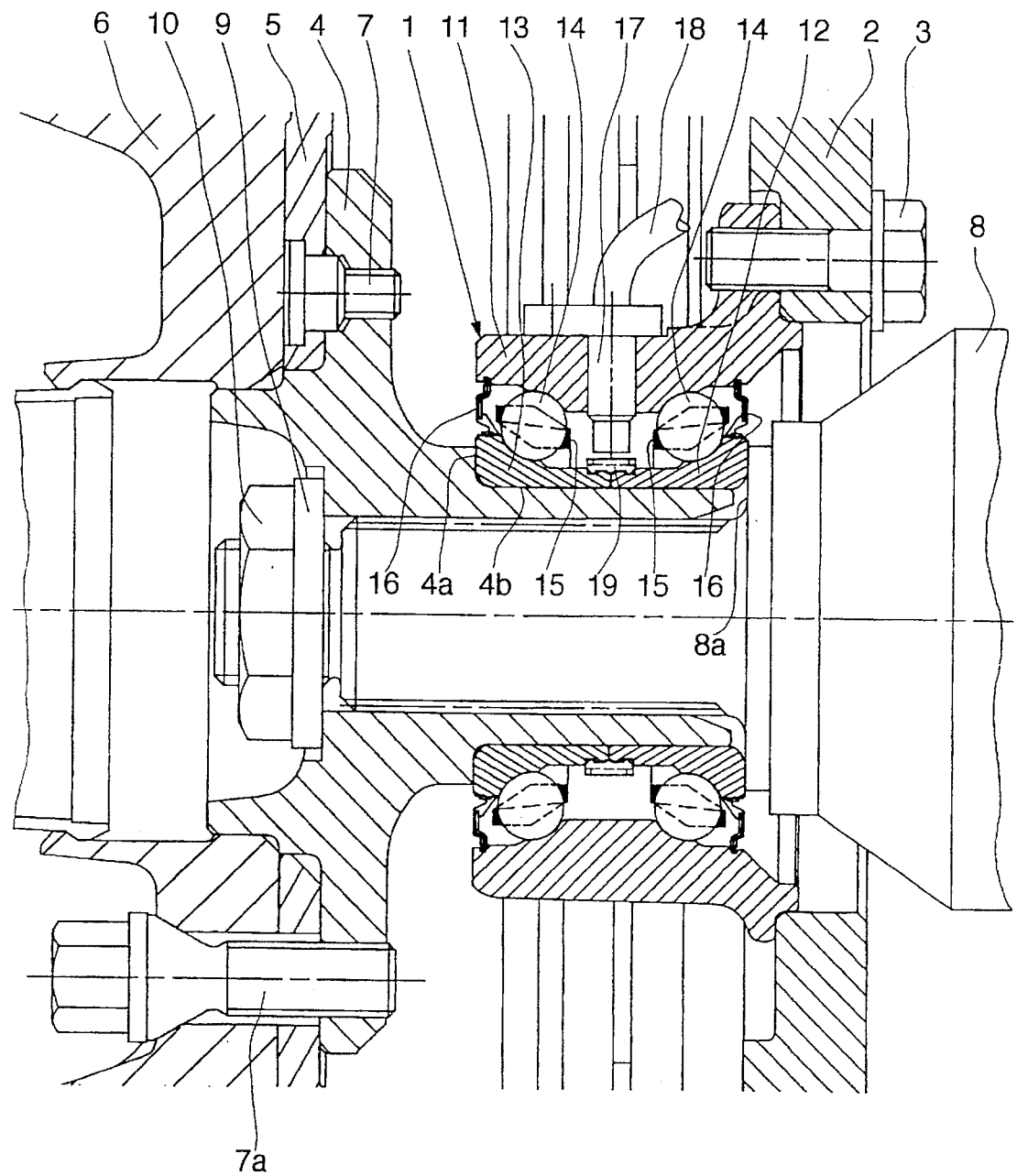
FIG. 1 is an axial section through the hub of the wheel of a vehicle, equipped with a rolling-contact bearing according to the invention.

As illustrated in FIGS. 1 to 4, the bearing 1 is fixed to the hub carrier 2 of the vehicle by means of screws 3. The bearing 1 is fitted snugly over a cylindrical surface 4b of the wheel hub 4. The brake disc 5 and the wheel 6 are fixed to the wheel hub 4 by several screws 7 and 7a. The wheel hub 4 is mounted on the drive shaft 8 and immobilized by a washer 9 and a nut 10. When the nut 10 is tightened, the bearing 1 is clamped axially between a radial bearing surface 4a of the wheel hub 4 and a radial bearing surface 8a of the drive shaft 8.

The bearing 1 comprises a stationary outer race 11 which is in contact with the hub carrier 2 of the vehicle, two rotating inner races 12 and 13 which are in contact with the wheel hub 4, two rows of rolling bodies, for example balls 14, held in cages 15, two seals 16, a sensor 17 connected to a signal-processing device, not represented, by a cable 18, and an encoder 19. The sensor 17 is arranged in a radial hole of the outer race 11 and projects into the annular space bounded by the outer race 11, the inner races 12 and 13 and the balls 14. The encoder 19 is fixed on the two inner races 12 and 13, and comes a small distance from the sensor 17.

The encoder 19 comprises a ring-shaped active part 20 of small thickness, and made for example of magnetic steel, and a support part 21 made of a non-magnetic synthetic material. The active part 20 is pierced with a plurality of openings or windows 22 separated by strips 23. The support part 21 of the encoder 19 is equipped with two rows of teeth 24 at the axial ends of its face 21a in contact with the inner races 12 and 13.

The inner races 12 and 13 are provided, close to their plane of contact 25, with an annular slot 26 forming a holding region, of width equal to half the axial width of the encoder 19. The inner races 12 and 13 are also provided at the bottom of the slot 26 and close to the plane of contact 25, that is to say to their front surfaces, with an annular rib 27, of which the edge 27a situated close to the teeth 24 of the encoder 19 is substantially radial so as to hold the teeth 24. Each slot 26 comprises a bearing surface 28 on its end opposite the plane of contact 25. The bearing surfaces 28 are radial so as to secure the support part 21 of the encoder 19 axially.

By virtue of this configuration, the active part 20 of the encoder 19 is insulated and radially distant from the inner races 12 and 13, which makes it possible to make the said active part 20 from relatively thin sheet. Before the bearing 1 is mounted on the wheel hub 4, the two inner races 12 and 13 are held axially by the interaction of the teeth 24 of the support part 21 of the encoder 19 and the edge 27a of the rib 27 of the inner races 12 and 13. The encoder 19 is positioned accurately facing the sensor 17, because it is secured axially after mounting by the bearing surfaces 28 of the inner races 12 and 13.

In FIG. 5, elements which are identical to those of the preceding figures bear the same references. The inner races 12 and 13 are provided with an additional shoulder 29 which is slightly wider than half the axial width of the encoder 19. The lateral surface 20a of the active part 20 can come into contact with the shoulder 29 in the event of a substantial shift of the encoder 19 in the event that the bearing surfaces 28 are insufficient to hold the encoder 19 axially and prevent it from coming into contact with the balls 14.

Figure 6:
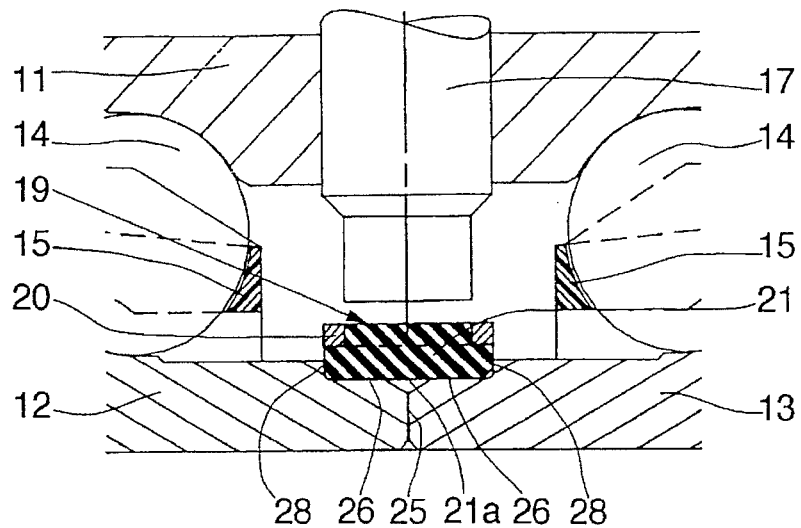
FIG. 6 is a detail of a rolling-contact bearing according to a third embodiment of the invention.

In FIG. 6, elements which are identical to those of the preceding figures bear the same references. The slots 16 in the inner races 12 and 13 here do not have any ribs. The bottoms of the slots 26 are cylindrical and connect with the radial bearing surfaces 28. The bore 21a in the support part 21 of the encoder 19 is cylindrical, in contact with the bottom of the slot 26. The inner races 12 and 13 are held axially before the bearing 1 is mounted on the wheel hub 4 by the support part 21 being clamped against the slots 26, which produces sufficient friction. The synthetic material of which the support part 21 is composed is therefore selected to exhibit a high coefficient of friction.

Figure 7:
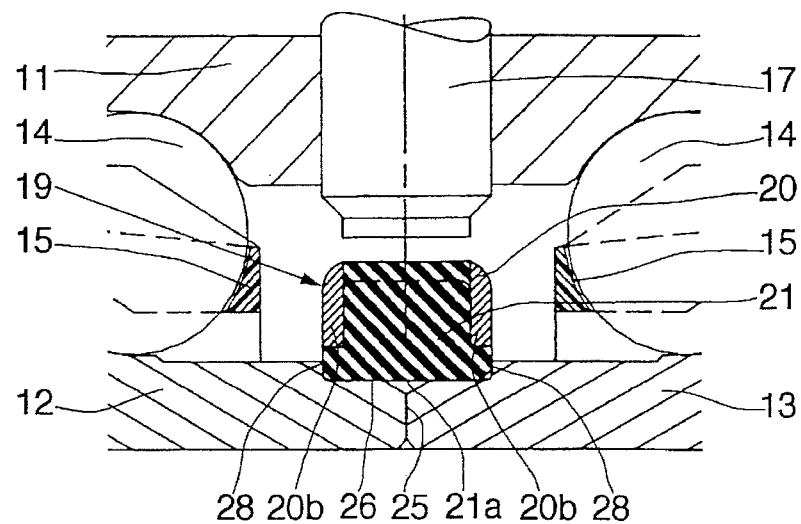
FIG. 7 is a detail of a rolling-contact bearing according to a fourth embodiment of the invention.

In FIG. 7, elements which are identical to those of the preceding figures bear the same references. The active part 20 of the encoder 19 is provided with a U section, the central portion of the U facing the sensor 17 and the lateral legs 20b of the U axially surrounding the support part 21 of the encoder 19. The active part 20 thus produced is extremely rigid and is less out of true, which increases the precision of the signal in the sensor 17.

Figure 8:
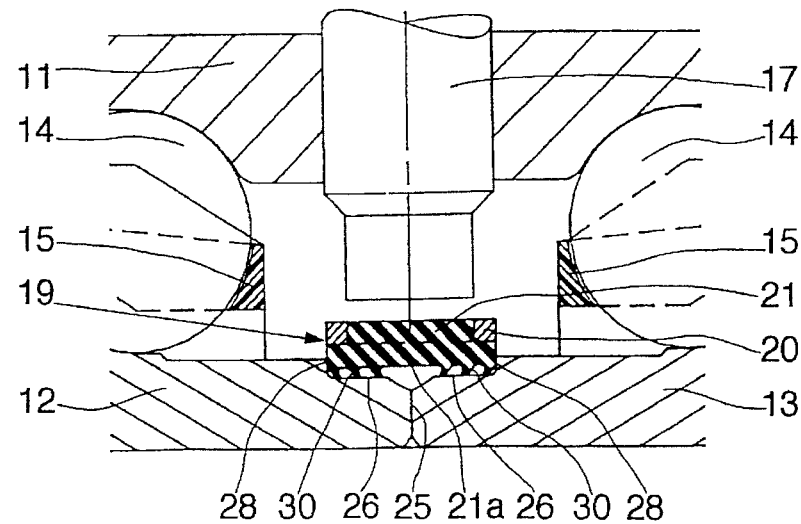
FIG. 8 is a detail of a rolling-contact bearing according to a fifth embodiment of the invention.

In FIG. 8, elements which are identical to those of the preceding figures bear the same references. The support part 21 of the encoder 19 is provided on its bore 21a with several annular ribs 30 bearing against the bottom of the slots 26. The ribs 30 are inclined towards the plane of contact 25 so that they exert a holding force by a bracing effect if the inner races 12 and 13 tend to move apart. The ribs 30 have a height which is less than the depth of the slot 26. The support part 21 is thus in axial contact with the radial bearing surfaces 28 which form a shoulder preventing an axial movement of the encoder 19 after the bearing 1 has been mounted on the wheel hub 4.

Figure 9:
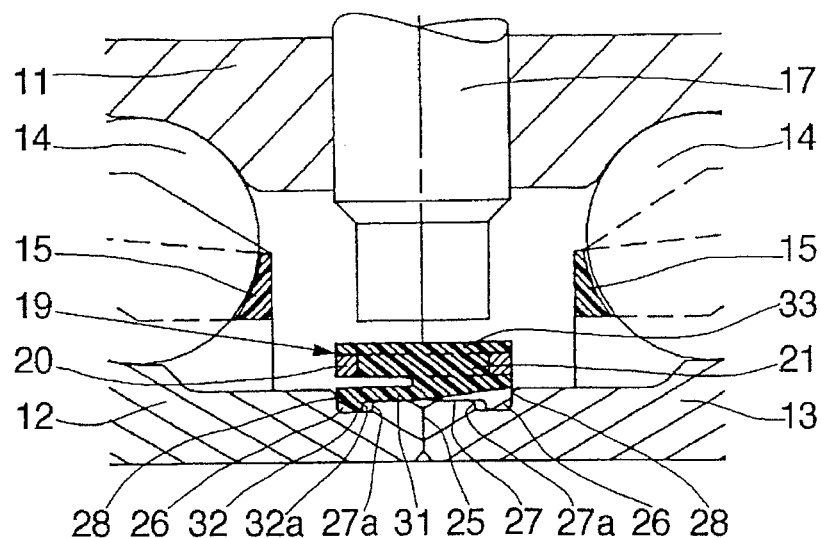
FIG. 9 is a detail of a rolling-contact bearing according to a sixth embodiment of the invention.
Figure 10:
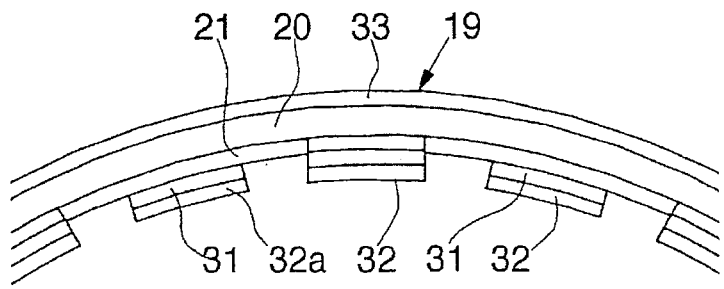
FIG. 10 is a part side view of the encoder of FIG. 9.

In FIGS. 9 and 10, elements which are identical to those of the preceding figures bear the same references. The support part 21 of the encoder 19 comprises, on its bore, axially elongate tabs 31 which are terminated at their free ends by projections 32 into the slots 26. The tabs 31 alternate so that when one tab 31 is in contact with the inner race 12, the next tab 31 in the circumferential direction is in contact with the inner race 13. The projections 32 of the tabs 31 are equipped with a radial portion 32a which faces the radial edge 27a of the ribs 27 and is capable of coming into contact with the edges 27a of the ribs 27 if the inner races 12 and 13 tend to move apart. The active part 20 of the encoder 19 is covered with a layer 33 of the synthetic material forming the support part 21, this making it possible to protect the active part 20 effectively.

Figure 11:
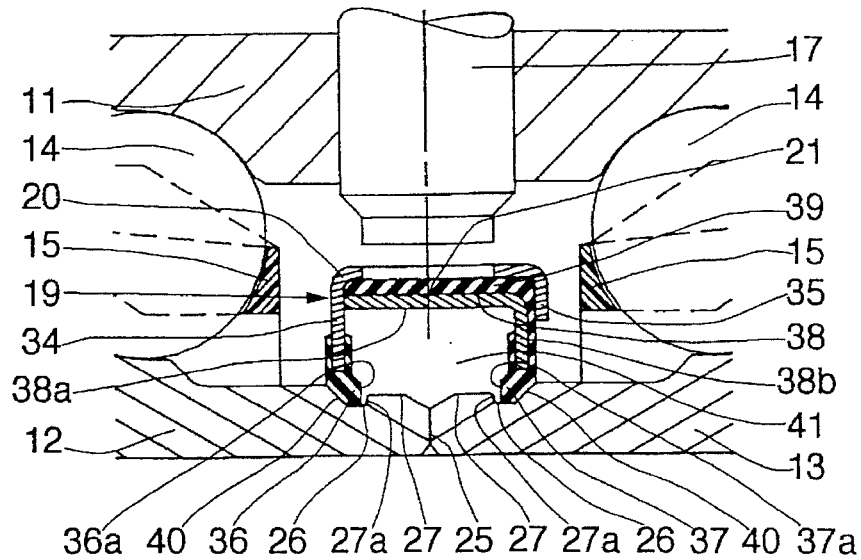
FIG. 11 is a detail of a rolling-contact bearing according to a seventh embodiment of the invention.

In FIG. 11, elements which are identical to those of the preceding figures bear the same references. The active part 20 of the encoder 19 has a U section with uneven legs. The first leg 34 bears at its free end a bearing lip 36 in contact with the slot 26 in the inner race 13. The bearing lip 36 is made of a flexible material overmoulded on the end of the leg 34. The second leg 35 which is shorter than the leg 34 keeps the support part 21 between the legs 34 and 35. The support part 21 comprises an additional annular element 38 made of non-magnetic material, with an L section and a flexible element 39 overmoulded onto the additional annular element 38. The additional annular element 38 comprises a cylindrical leg 38a, the free end of which is in contact with the leg 34 of the active part 20, and the other end of which connects with the radial portion 38b, the end of which bears a bearing lip 37 in contact with the inner race 12 at the bottom of the slot 26. The flexible element 39 is overmoulded on the additional annular element 38 and separates it from the active part 20 of the encoder 19, except at the free end of the cylindrical portion 38a of the additional annular element 38. The two bearing lips 36 and 37 each comprise a radial portion 36a, 37a facing the edge 27a of the rib 27 and capable of coming into contact with the edge 27a if the inner races 12 and 13 tend to move apart. The bearing surfaces 40 of the slots 26 of the inner races 12 and 13 are oblique and prevent the encoder 19 from coming into contact with the balls 14 when the inner races 12 and 13 are being assembled. The encoder 19 and the inner races 12 and 13 define an annular chamber 41.

Thus produced, the active part 20 of the encoder 19 is far enough away from the inner races 12 and 13 to provide a good quality signal in the sensor 17, and has qualities of rigidity which are due to its U section and to the presence of the additional annular element 38.

By virtue of the invention, the encoder axially secures the inner races of the bearing after they have been assembled and cannot come into contact with the rolling bodies during the said assembly operation.

We claim:

1. Rolling-contact bearing (1) comprising at least one outer race (11), two inner races (12,13), two rows of rolling bodies (14) held in cages (15) and a built-in device for detecting the speed of rotation, of the type comprising a sensor means (17) and an encoder means (19) which are located in the annular cheer defined between the inner races and outer race and the rolling bodies, the encoder means (19) comprising an active part (20) capable of creating in the sensor means (17) a periodic signal of frequency proportional to the rotational speed of the bearing (1), characterized in that the encoder means (19) comprises a support part (21) secured to the inner races (12,13) and made of a nonmagnetic material, and equipped with means for axially holding the inner races (12,13) against each other before the bearing (1) is mounted in the mechanical assembly for which it is intended, the active part (20) being made from magnetic steel sheet.

2. Rolling-contact bearing according to claim 1, characterized in that the support part (21) of the encoder means (19) comprises a bore equipped with a plurality of inclined ribs (30) intended to prevent the two inner races (12,13) from separating after the bearing (1) has been assembled, by a bracing effect.

3. Rolling-contact bearing according to claim 1, characterized in that the support part (21) of the encoder means (19) comprises two lips (36,37), each one in contact with an inner race (12,13), on its axial ends, so as to define an annular chamber (41) between the said encoder means (19) and the said inner races (12,13).

4. Rolling-contact bearing according to claim 1, characterized in that the support part (21) of the encoder means (19) comprises means for axial holding which are capable of interacting with an annular slot (26) made on each inner race (12,13) of the bearing (1).

5. Rolling-contact bearing according to claim 4, characterized in that the holding means are arranged at the axial ends of the support part (21) of the encoder means (19).

6. Rolling-contact bearing according to claim 4, characterized in that the holding means each comprise a row of teeth (24) or an annular rib.

7. Rolling-contact bearing according to claim 4, characterized in that each inner race (12,13) comprises an annular rib (27) arranged at the bottom of the slot (26) close to the front surface of the race and provided with a substantially radial portion (27a) on its face opposite the front surface of the race, capable of interacting with the holding means of the support part (21) of the encoder means (19).

8. Rolling-contact bearing according to claim 4, characterized in that each annular slot (26) of an inner race (12,13) comprises a bearing surface (28) arranged between the bottom of the slot (26) and the edge of the slot (26) close to the rolling bodies (14) so as to form an axial stop for the encoder means (19) when the second inner race (13) is put in place in contact with the first inner race (12) and encoder means (19).

9. Rolling-contact bearing according to claim 8, characterized in that the inner races (12,13) comprise an additional shoulder (29) on the edge of the slot (26) close to the rolling bodies (14), this shoulder being intended to interact with a radial portion (20a) of the active part (20) of the encoder means (19).

10. Rolling-contact bearing according to claim 4, characterized in that the means for axially holding the support part (21) of the encoder means (19) comprise elastic tabs (31) directed axially, alternating and equipped at each of their free ends with a projection (32) intended to interact with the annular slots (26) in the inner races (12,13).

11. Rolling-contact bearing according to claim 10, characterized in that the active part (20) of the encoder means (19) is covered with the synthetic material of the support part (21).

12. Rolling-contact bearing according to claim 4, characterized in that the active part (20) of the encoder means (19) has a U section, the lateral legs (20b) of the U axially surrounding the support part (21) of the encoder means (19) and the central portion of the U being arranged facing the sensor means (17).

13. Rolling-contact bearing according to claim 12, characterized in that the encoder means (19) comprises an additional annular element (38) with an L section arranged inside the active part (20) of U section and made of a non-magnetic material, comprising a radial leg (38b) and an axial leg (38a) arranged between the central portion of the active part (20) of the encoder means (19) and the inner races (12,13) and separated from the central portion of the active part (20) by an overmoulded elastomer layer, the said additional annular element (38) being intended to improve the quality of the signal in the sensor means (17) and the rigidity of the encoder means (19).

14. Rolling-contact bearing according to claim 1, characterized in that the rolling bodies (14) are balls.

15. Rolling-contact bearing according to either one of the preceding claims, characterized in that the inner races (12, 13) comprise holding regions which interact with the support part (21) of the encoder means (19).

16. Rolling-contact bearing according to claim 15, characterized in that the support part (21) of the encoder means (19) comprises a bore which axially holds the inner races (12,13) by clamping them and interacts with the holding regions of the inner races (12,13).

17. Rolling-contact bearing according to claim 16, characterized in that each inner race (12,13) comprises a shoulder adjacent to the holding region and intended for axially securing the support part (21) of the encoder means (19).

* * * * *